E. De B. FREER.
Car Brake.

No. 96,098. Patented Oct. 26, 1869.

Witnesses:

Inventor:
Eugene de B. Freer

United States Patent Office.

EUGENE DE B. FREER, OF LIMA CENTRE, MICHIGAN.

Letters Patent No. 96,098, dated October 26, 1869.

IMPROVED RAILWAY-CAR BRAKE.

The Schedule referred to in these Letters Patent and making part of the same.

*To all whom it may concern:*

Be it known that I, EUGENE DE B. FREER, of Lima Centre, in the county of Washtenaw, in the State of Michigan, have invented a new and improved Railway-Car Brake; and I do hereby declare that the following is a full and exact description thereof, reference being had to the accompanying drawings, and to the letters of reference marked thereon, in which—

Figure 1:
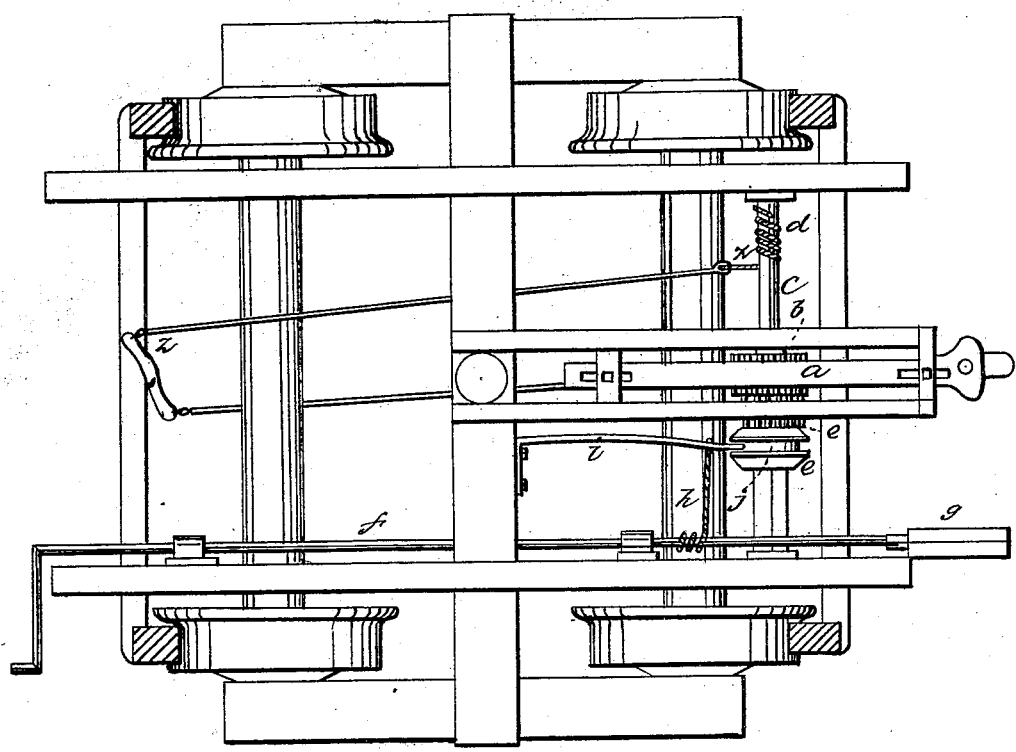
Figure 1 is a plan of the machine.
Figure 2:
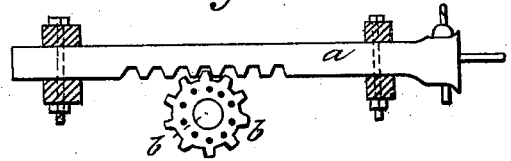
Figure 2 is a detached view of rack-bar and coupling with pinion.

The nature of my invention consists in operating the brakes by the momentum of the cars, which I accomplish in the following manner:

The coupling-bar $a$ is provided with teeth on its under side, which work the pinion $b$ with shaft or windlass $c$. The chain $x$, from the long arm of the brake-lever $z$, is wound upon shaft $c$, as shown at $d$. Said pinion and shaft are provided with clutch $e$, which, when drawn away from the pinion, prevents it from rotating the shaft $c$, thus rendering the brakes inoperative while backing. Said clutch is controlled by the engineer, by means of a lever attached to longitudinal bar $f$, running the whole length of each car, and coupled at both extremities with a square stem and socket, $g$, the socket being long enough to allow the necessary play between the cars without the rods coming together. Said bar is wound opposite to each clutch with one end of chain $h$. The other end of said chain is attached to spring $i$, which rests in a slot, $j$, on clutch. Said spring presses the clutch against the pinion $b$, when it is not drawn from it by means of longitudinal bar $f$ and chain $h$.

Operation.

As the motion of the engine is retarded by braking its tender in the ordinary manner, the momentum of the train would cause each car successively to push forward upon the other, thus driving the coupling and rack-bar $a$ toward the middle of the car, rotating the pinion $b$ with shaft or windlass $c$, which winds up the chain $x$, and draws upon the long arm of the brake-lever, in the same manner as in the ordinary brake. When the cars are again drawn upon, the motion of shaft $c$ is reversed, which, of course, allows the brakes to spring back from the wheels.

What I claim, and desire to secure by Letters Patent, is—

The combination of the rack and coupling-bar $a$ with the clutch and pinion, $e$ and $b$, spring $i$, windlass $c$, longitudinal bar $f$, and coupling $g$, arranged substantially in the manner and for the purpose set forth.

EUGENE DE B. FREER.

Witnesses:
ALPHEUS FELCH,
E. W. WHITMORE.